US010834450B2

(12) United States Patent
Inayatullah et al.

(10) Patent No.: US 10,834,450 B2
(45) Date of Patent: Nov. 10, 2020

(54) DIGITAL CONTENT AUDIENCE MATCHING AND TARGETING SYSTEM AND METHOD

(71) Applicant: NBCUniversal Media, LLC, New York, NY (US)

(72) Inventors: Azfar Inayatullah, Princeton Junction, NJ (US); Sanjay Macwan, Marlboro, NJ (US); Sowmya Gottipati, Marlboro, NJ (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 14/502,749

(22) Filed: Sep. 30, 2014

(65) Prior Publication Data
US 2016/0094894 A1    Mar. 31, 2016

(51) Int. Cl.
| H04N 21/235 | (2011.01) |
| H04N 21/422 | (2011.01) |
| H04N 21/258 | (2011.01) |
| G06Q 30/02 | (2012.01) |
| H04N 21/658 | (2011.01) |
| H04N 21/442 | (2011.01) |
| H04N 21/25 | (2011.01) |
| H04H 60/66 | (2008.01) |
| H04H 60/31 | (2008.01) |
| H04H 20/10 | (2008.01) |

(52) U.S. Cl.
CPC ... *H04N 21/25891* (2013.01); *G06Q 30/0261* (2013.01); *G06Q 30/0269* (2013.01); *H04H 60/31* (2013.01); *H04H 60/66* (2013.01); *H04N 21/251* (2013.01); *H04N 21/25883* (2013.01); *H04N 21/44218* (2013.01); *H04N 21/44222* (2013.01); *H04N 21/6582* (2013.01); *H04H 20/103* (2013.01); *H04N 21/42202* (2013.01)

(58) Field of Classification Search
CPC ... H04N 21/21; H04N 21/234; H04N 21/2552
See application file for complete search history.

(56) References Cited

U.S. PATENT DOCUMENTS

| 7,900,229 | B2 * | 3/2011 | Dureau | G06Q 30/0251 705/14.49 |
| 8,065,703 | B2 * | 11/2011 | Wilson | G06Q 30/02 705/14.52 |
| 8,209,181 | B2 * | 6/2012 | Heckerman | G09B 19/00 379/88.02 |
| 8,484,676 | B1 * | 7/2013 | Narsimhan | H04N 21/4126 348/734 |

(Continued)

Primary Examiner — Mushfikh I Alam
(74) Attorney, Agent, or Firm — Fletcher Yoder, P.C.

(57) ABSTRACT

Digital content is indexed and available to be provided to a target audience based upon possible interest. Components and/or sensors detect audience-related data indicative of the target audience, possible audience interest, audience behavior, and other audience-related factors. Components and/or sensors detect device-related data indicative of available devices to which available content may be sent, transmission paths for the content, and related factors. An analysis and matching engine matches the available content to the target audience and one or more of the devices and selects content, devices, and transmission paths for directing the selected content for an enhanced audience experience.

20 Claims, 5 Drawing Sheets

(56) References Cited

U.S. PATENT DOCUMENTS

| | | | | |
|---|---|---|---|---|
| 8,510,737 B2* | 8/2013 | Kunjithapatham | ... | G06F 9/4843 340/12.22 |
| 8,893,164 B1* | 11/2014 | Teller | ... | H04N 21/4307 725/12 |
| 9,329,757 B1* | 5/2016 | Mortensen | ... | A63F 9/24 |
| 9,407,710 B2* | 8/2016 | Li | ... | H04N 21/44222 |
| 2007/0204308 A1* | 8/2007 | Nicholas | ... | H04N 7/17318 725/86 |
| 2009/0019466 A1* | 1/2009 | Steuer | ... | H04H 60/37 725/9 |
| 2009/0271819 A1* | 10/2009 | Cansler | ... | G06Q 30/02 725/34 |
| 2010/0122277 A1* | 5/2010 | Fonseca | ... | G11B 27/105 725/10 |
| 2011/0016492 A1* | 1/2011 | Morita | ... | H04N 5/44543 725/58 |
| 2011/0279446 A1* | 11/2011 | Castro | ... | G01C 21/20 345/419 |
| 2012/0151055 A1* | 6/2012 | Kansal | ... | G06F 1/3209 709/225 |
| 2012/0304206 A1* | 11/2012 | Roberts | ... | H04H 60/33 725/12 |
| 2012/0304233 A1* | 11/2012 | Roberts | ... | H04N 21/23113 725/82 |
| 2012/0324493 A1* | 12/2012 | Holmdahl | ... | H04H 60/33 725/12 |
| 2012/0324494 A1* | 12/2012 | Burger | ... | H04H 60/33 725/12 |
| 2012/0324495 A1* | 12/2012 | Matthews | ... | H04H 60/372 725/14 |
| 2013/0083025 A1* | 4/2013 | Gibson | ... | G06F 3/1438 345/428 |
| 2013/0091207 A1* | 4/2013 | Diab | ... | H04W 4/21 709/204 |
| 2013/0212606 A1* | 8/2013 | Kannan | ... | H04N 21/4667 725/12 |
| 2013/0254787 A1* | 9/2013 | Cox | ... | G06Q 30/02 725/13 |
| 2013/0273941 A1* | 10/2013 | Grokop | ... | H04N 21/24 455/456.3 |
| 2013/0339999 A1* | 12/2013 | SanGiovanni | ... | G06Q 30/0241 725/34 |
| 2014/0003450 A1* | 1/2014 | Bentley | ... | H04N 7/15 370/468 |
| 2014/0165094 A1* | 6/2014 | Hardy | ... | H04N 21/25841 725/34 |
| 2014/0168277 A1* | 6/2014 | Ashley | ... | G06F 3/1446 345/672 |
| 2014/0173640 A1* | 6/2014 | Walsh | ... | G06Q 30/02 725/8 |
| 2014/0201767 A1* | 7/2014 | Seiden | ... | H04N 21/44218 725/12 |
| 2014/0245335 A1* | 8/2014 | Holden | ... | H04N 21/44218 725/12 |
| 2014/0282669 A1* | 9/2014 | McMillan | ... | H04N 21/44213 725/19 |
| 2014/0282693 A1* | 9/2014 | Soundararajan | ... | H04N 21/41407 725/32 |
| 2015/0128159 A1* | 5/2015 | Weinblatt | ... | H04N 21/44218 725/12 |
| 2015/0135225 A1* | 5/2015 | Bayer | ... | H04N 21/4826 725/46 |
| 2015/0150029 A1* | 5/2015 | Shaw | ... | H04N 21/25891 725/5 |
| 2015/0195399 A1* | 7/2015 | Way | ... | H04M 1/72577 455/418 |
| 2015/0201225 A1* | 7/2015 | Yin | ... | H04N 21/23439 725/95 |
| 2015/0281756 A1* | 10/2015 | Soon-Shiong | ... | H04N 21/2668 725/14 |
| 2015/0326922 A1* | 11/2015 | Givon | ... | H04N 21/44218 725/10 |
| 2016/0037213 A1* | 2/2016 | Collins | ... | H04N 21/44218 725/10 |
| 2016/0073162 A1* | 3/2016 | Cooperstein | ... | H04N 21/4668 725/114 |
| 2016/0266747 A1* | 9/2016 | Leatham | ... | H04N 21/4122 |
| 2016/0295269 A1* | 10/2016 | Liu | ... | H04N 21/4122 |

* cited by examiner

DIGITAL CONTENT AUDIENCE MATCHING AND TARGETING SYSTEM AND METHOD

BACKGROUND

The invention relates generally to the field of digital content delivery, and particularly to the matching and targeting of content to potentially interested audiences based upon a range of known and detected data points.

Over the past decades, delivery of content to audiences (e.g., for entertainment, educational, and similar purposes) has evolved very significantly. Historically, films, books, and print matter were delivered by conventional cinemas, through the mail, and through retail establishments. Conventional television transmissions evolved from broadcast technologies to cable, satellite and digital delivery, such as via the Internet. Moreover, distribution of content in various channels may involve broadcast, download, streaming, unicast, and so forth. While all of these technologies still exist in parallel, of increasing importance has been the delivery of content via digital means that can be manipulated when desired, and the adaptation of content to specific audiences, typically upon request. In many situations, audiences may still experience content on regular schedules, such as through linear broadcast, satellite and cable programming. However, increasingly audiences select times and places for reception and playback, using time shifting techniques, storage techniques, on-demand techniques, non-linear Internet-based content retrieval, and so forth.

While audiences may increasingly select particular content based at least in part on the particular device on which the content is to be experienced (e.g., television, computer, smartphone, etc.), there is increasing interest in adapting content for both large audiences, as well as for individuals with or without active participation of the audience. That is, it is commonplace for advertisements to be adapted for particular demographics, times, audiences, and even individuals. These advertisements may be added to or fed prior to, during or after desired content based upon detectable audience preferences. Enhancement in this area are still needed, however.

For example, apart from ad placement in specifically allocated timeslots, the adaptation of actual content based upon potential audience interest is not commonly performed today. In general, once compiled and prepared for distribution, the content itself is generally not altered, although certain minor supplements may be made to it, such as closed captioning, language options, and the like. Similarly, superimposed advertisements and recommendations are common with various types of content, but these have not been used to alter the content stream itself. Few or no successful attempts have been made at altering content based upon potential audience interest during the content experience, or to select and direct content to potential audiences, their playback devices, and via transmission paths based on collected and analyzed data.

In particular, content is often associated with audio and/or video files, and may include ads, metadata, instructions/metrics, and, more generally, replacement or supplemental content that is sent to or received from audiences. In the early days, most of the content sent to consumers had little to no immediate feedback, and there was no way to determine whether the content was of particular relevance or interest to the audience. Often an audience's likes and dislikes were usually slated for the next release, if at all, and assuming that market or other information was available as a guide. However, as noted above, with more recent advances, particularly in technologies and interfaces that allow for two-way communications, audiences are able to pick content, select a device for enjoying content, and sometimes to select a delivery channel or path. Such technologies, while allowing for greater selectivity and flexibility, result in processes that are laborious at best.

There is a need for further advancement and facilities in this field. There is a particular need for more intelligent and pro-active technologies that might be termed "Content-Finds-Consumer", and that effectively flip the traditional model, enabling content to be selected and delivered to audiences intelligently, resulting in effortless process for the audience. The present disclosure relates to technologies directed to such improvements. The approach described here is fully scalable, adaptable and portable, redefining how content will be consumed and monetized in the future. In addition, this architecture provides control points for content providers, distributors, and audiences.

BRIEF DESCRIPTION

In accordance with certain aspects of the disclosed technology, a method for providing digital content to a target audience comprises monitoring audience-related data indicative of a specific target audience as an indication of potential interests of the target audience, and monitoring device-related data indicative of a content playback device available to the target audience. Content-related data related to available content is referenced, and it is determined whether any element of available content matches the target audience based upon the audience-related data and the device-related data. A selected element of the available content is then provided based upon a match of the content-related data and upon the audience-related data and the device-related data.

In accordance with another aspect of the disclosed technology, a method for providing digital content to a target audience comprises monitoring audience-related data indicative of a specific target audience as an indication of potential interests of the target audience, the audience-related data being collected from one or more components or sensors present in a location with the target audience and detecting data during a time when the target audience is experiencing based content. Device-related data is also monitored that is indicative of a content playback device available to the target audience, the device-related data being collected with respect to a plurality of different devices available to the target audience and/or to a plurality of different content transmission paths to such devices. Content-related data related to available content is monitored, and it is determined whether any element of available content matches the target audience based upon the audience-related data and the device-related data. A selected element of the available content is then provided based upon a match of the content-related data and upon the audience-related data and the device-related data.

In accordance with yet another aspect of the technology, a system for providing digital content to a target audience comprises audience-related data components and/or sensors that, in operation, monitor audience-related data indicative of a specific target audience as an indication of potential interests of the target audience, and device-related data components and/or sensors that, in operation, monitor device-related data indicative of a content playback device available to the target audience. Processing circuitry is configured to reference content-related data related to available content, and to determine a match between the available content and a target audience based upon the content-related data, the audience-related data, and the device-related data, the processing circuitry outputting recommendations and/or instructions for providing selected content from the available content based upon the match.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
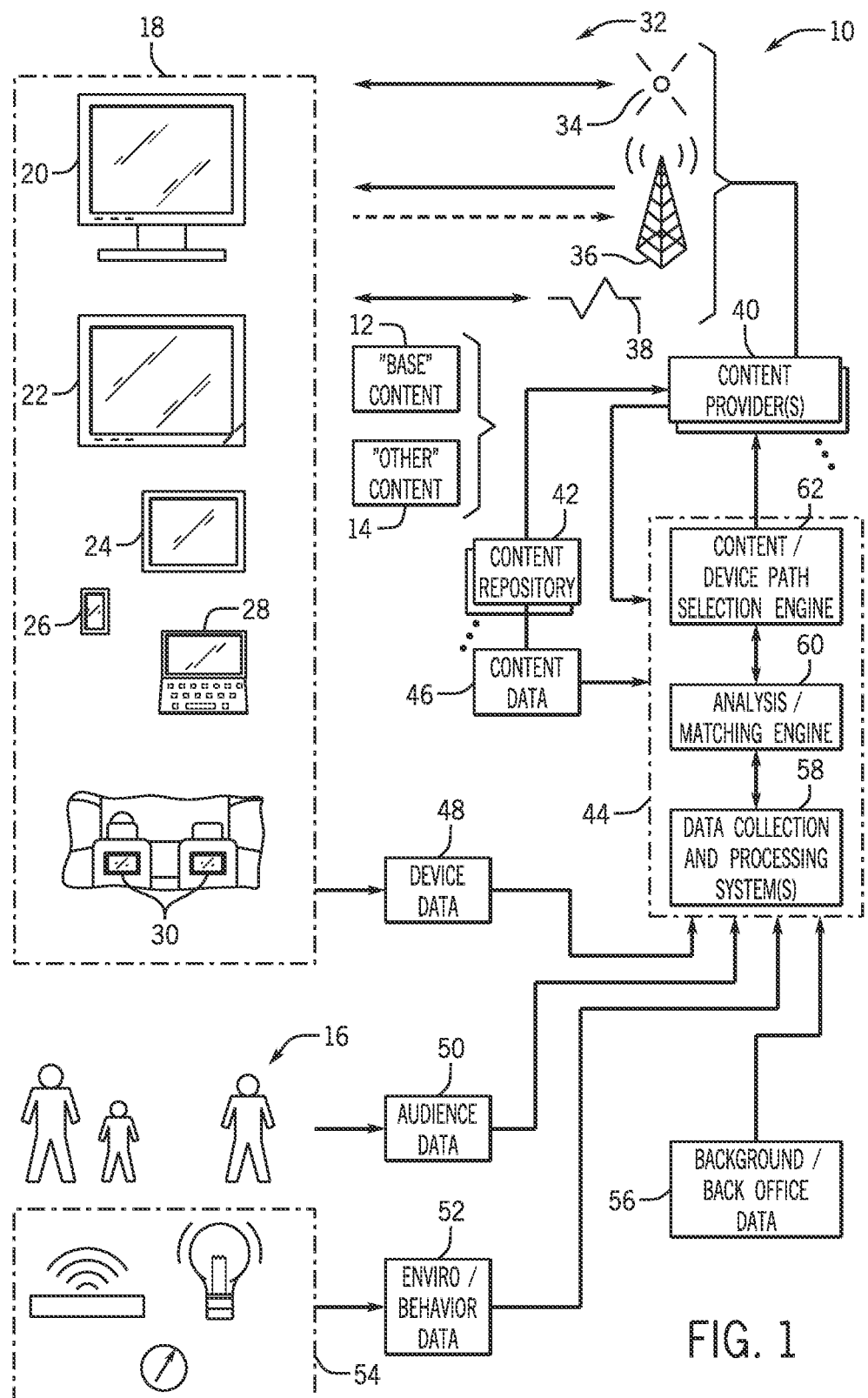
FIG. 1 is a diagrammatical overview of an exemplary digital content audience matching and targeting system in accordance with aspects of the present disclosure.

Turning now to the drawings, FIG. 1 illustrates an exemplary digital content audience matching and targeting system designated generally by the reference numeral 10. The system is designed to determine a range of device, audience, content and other data, and to select distribute content to audience members and devices, and via paths or routing that is most appropriate based on the data considered (that is in a true "Content-Finds-Consumer" scenario). The content may typically include "base" content 12 and "other" content 14, with the base content in many cases being selected by the audience (e.g., in a conventional manner), and the "other" content being selected and transmitted to enhance the audience experience, the audience here being indicated by reference numeral 16. However, it should be noted that such distinctions need not be present, or sharp, and some or all of the content may be selected and transmitted (or offered) to the audience without any base selection required of the audience. It should be noted that the content intended by the present disclosure may include a very wide range of offerings, such as television and film programming, videos, audio content, combined audio and visual content, content intended for both large and specific audiences, text based, software, instructions for devices (e.g., how to handle video and/or audio for devices with different processing, display and/or playback capabilities), metrics, and so forth. The content may be selected and transmitted as described below, and the selected content may both supplement and complement the base content so that elements of the content may be stacked or superimposed upon one another, and played or experienced together, or alternative content may be provided instead of specific portions of the content. Moreover, the selected content may be provided on other devices than the base content, or in some cases, only one stream of content may be provided, and that to a desired device and/or via a desired transmission path. In general, however, the techniques are not simply the replacement of advertisements in specific timeslots as is performed in certain conventional technologies. Rather, the content itself may be selected and distributed during the audience experience of the content.

Similarly, the audience to which the content is delivered should be understood to be both collective audiences and specific audiences, even to the level of an individual. Such collective audiences may, for example, include many consumers who experience the content at the same time or closely in time, such as through broadcast, satellite, cable and other media that distribute the content for consumption in accordance with regular schedules. However, the audience may also experience the content at different times, places, and manners, such as through time-shifting techniques, storage and recording of the content for later playback, through the use of various support media for the content, including digital media, disks, solid state and dynamic memory, and so forth.

In general, the audience will experience the content on one or more playback devices as indicated generally by reference numeral 18. In certain circumstances, the playback devices may include collective devices, such as cinemas and public displays. In many events, however, the playback devices will be provided in homes, businesses, automobiles, and other more limited venues. In the illustration of FIG. 1, the playback devices include, by way of example, a conventional television set 20 associated with a processing system, typically referred to as a cable, satellite or set-top box. As will be appreciated by those skilled in the art, the latter device often serves to receive the content, to decode the content, and to provide audio and visual signals to the television monitor and speakers for playback. Such devices may also exchange information with content providers in a bidirectional manner. Similarly, a playback device 22 in the form of an Internet-ready television will include circuitry that is adapted to receive and process content, and in certain events to exchange data with the content provider as desired. In both of these scenarios, various supplemental devices, including modems, routers, streaming media devices, computers, and so forth may be associated with the sets to provide enhanced functionality (these devices are not separately illustrated in the figure). Still further, personalized devices such as tablets and hand-held computers, and monitors may be utilized as indicated by reference numeral 24. Other devices may include various types of smartphones and hand-held media players 26. Various computers, laptops, and the like may be utilized as indicated by reference numeral 28. Finally, many other devices, venues, and scenarios may be envisioned for the devices, such as devices 30 located in an automobile or other vehicle. As with conventional and developing devices of this type, content may be received, decoded, and played back, but content may also be stored for later experiencing. Some or all of these devices may also be adapted for receipt and playback of content in real time or near-real time as the content is distributed. However, where storage and time-shifting techniques are utilized, timing is much more flexible. Where Internet distribution and other individualized content demand and receipt technologies are utilized, the content may be requested, distributed and played back in a highly individualized manner.

Regardless of the particular device utilized, the particular audience targeted, or the particular content distributed, the present techniques allow for detection and consideration of many different factors and data points to determine and predict possible audience interest. Based upon such predictions, the content itself may be selected and distributed to provide an enhanced audience experience. The present techniques allow for detection of certain data and selection and distribution of the content as the content is being experienced by the audience. Thus, a tight time loop (that is, in a content-relevant time frame) may be maintained in which audience feedback is obtained (with or without actual conscious audience participation), and selection and distribution of the content is made based upon data that may be indicative of audience appreciation, audience preferences, best devices and paths for transmission, and a range of considerations (e.g., economic, commercial, cultural, community value, educational, among others).

Ultimately, one or more content delivery systems 32 is called upon to distribute the content to the audience. Such content delivery systems may include or be adapted for two-way communication were available. That is, one or more content streams may be "pushed" to the audience, and this may occur at the same or different times, depending upon the technologies for distribution. Exemplary distribution technologies may include, for example, satellite systems 34, broadcast (i.e., airwave) systems 36, cable, Internet and similar systems 38, and so forth. The systems may further include cellular networks, various types and topographies of networks (e.g., LANs, WANs, Bluetooth, etc.), electrical power networks (e.g., data over powerline). In some applications content may be delivered to different devices (and data may be retrieved) by the same or parallel channels as described below. The content is generally supplied by one or more content providers 40. Any other current or future developed technologies may also be utilized for distribution of the content and for retrieval of certain data useful in making the predictions and selections of the content, devices, and paths for content transmission. The content will typically be drawn by the providers from a content repository 42, and in practice many such repositories may be used.

Among the data that may be considered for the selection of the content, devices, and transmission paths, content-related data, device-related data, audience-related data, and audience environment and behavior-related data may be particularly useful. Other background and "back office" data may also be highly reliable for the selections. These are discussed in greater detail below. A content matching system 44 considers such data and will implement one or more selection algorithms, which themselves may be adapted or change over time, or as more or different data becomes available. As illustrated in FIG. 1, the system 44 will receive content data 46, device data 48, audience data 50, and environment and behavior data 52. The latter may be developed (i.e., sensed, encoded, processed, etc.) by one or more sensors or devices 54 available in the vicinity of the audience 16. The system may also receive and consider the background/back office data 56. As described below, based upon such data the system may determine, of all available content in the repository, which content may be suitable or of particular interest to the target audience, which device the content may be best enjoyed on, and what transmission path would be best for the transmission (including features, limitations, and parameters of the various available paths).

With regards to the sensors and devices 54, environmental factors may include, for example, lighting, temperature, location, movement, and a wide and almost unlimited number of different considerations generally representative of the conditions in which content is being experienced by the audience. Events and behavioral factors will typically reflect the behavior of the audience members, including movements, gaze, changes in content selection (e.g., requesting additional different content, changing a channel, increasing or decreasing audio volume, visiting websites or other content during the experience of the primary content, and so forth). In the illustration of FIG. 1, certain environmental devices are illustrated. These may include, for example, motion detection devices, including gaming systems, motion detectors, range cameras, and so forth. Temperature sensors and environmental control settings for the environment may be included (e.g., smart thermostats). Similarly, lighting and other factors and devices may be considered. Increasingly, these will be networked so that, where permitted by the audience members, settings and states of these devices can be detected, collected, and transmitted for consideration by content providers. The data collected in this manner will typically be of interest insomuch as it may affect the experience of the audience with respect of the content. Thus, selection of the content, target devices, and best transmission paths may be made to enhance the experience based upon audience behaviors, environmental factors, and so forth.

"Background and back office" data may include information that is known or knowable by content providers that may be interesting or informative in predicting audience appreciation or interest. Many content providers will or can know such information, and examples are provided below. This may include certain historical data, such as data representative of content that the audience has selected and experienced in the past, behaviors of the audience in the past, environmental conditions under which certain content was experienced in the past, and so forth. Certain subscription information may also be available, and this will typically be more static, although it may change or be changed by the audience from time to time. Subscription information may include, for example, certain channels or content types of providers for which the audience has paid or subscribed, the utilization of such subscription services, and so forth. A wide range of such data may be available, including data related to location of the audience, the type of device utilized by the audience, available bandwidths of the devices and infrastructure, demographics in the local area in which the audience is located, purchases, preferences, and so forth that were made by the audience, and the like.

Figure 2:
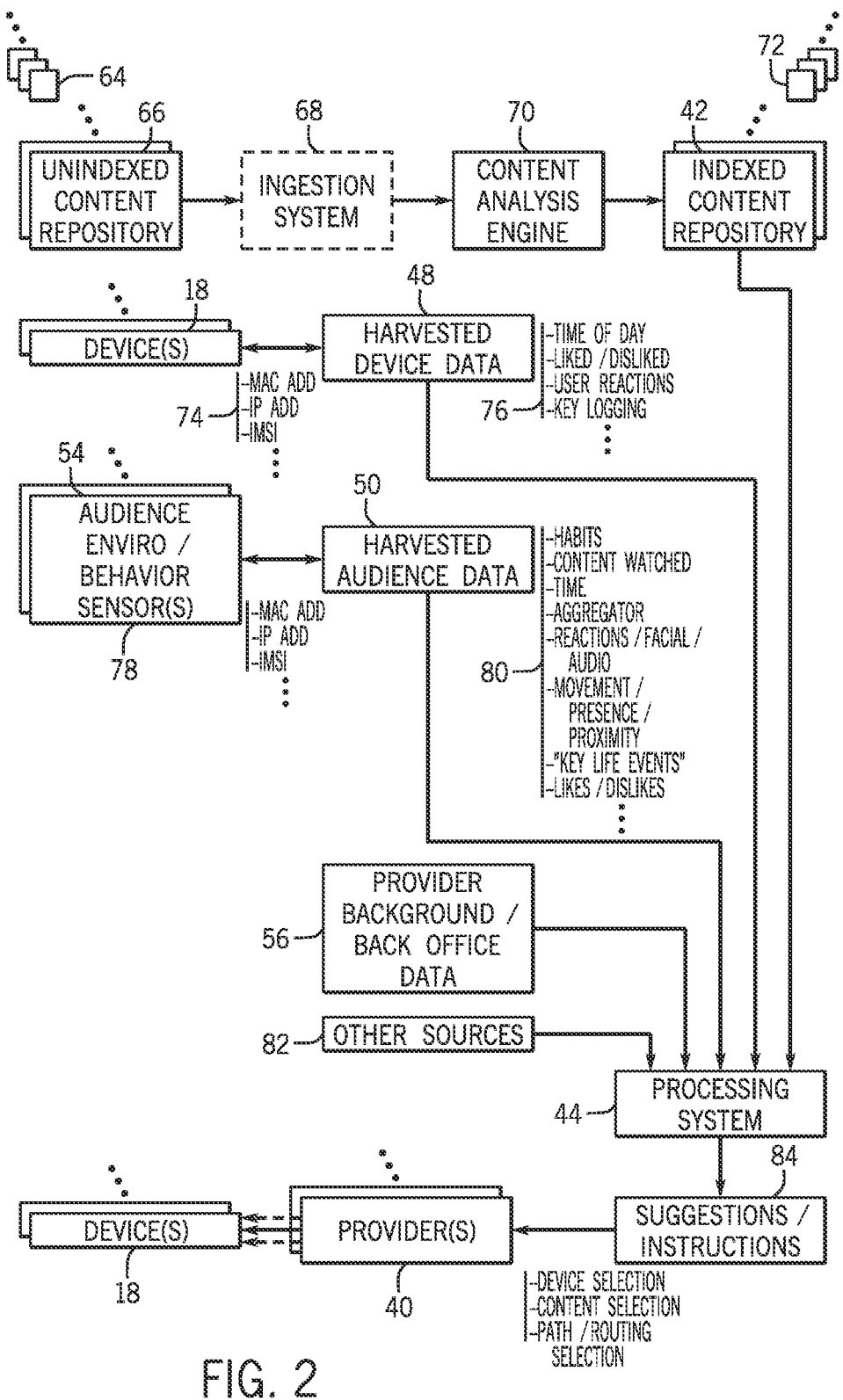
FIG. 2 is a diagrammatical representation of exemplary components and data flow in a system of the type shown in FIG. 1.

One or more data collection and processing systems 58 serve to receive and process this data. Based upon some or all of the available information, the data collection and processing systems will implement various algorithms that may be developed and refined over time to make determinations of audience interest in particular content through the use of one or more analysis and matching engines as indicated by reference numeral 60. It should be noted that the data collection and processing systems and the analysis and matching engines will often be implemented in one or more computer systems which will most often be remote from the location in which the content is experienced. These systems may collect the information via Internet connections, data storage and data libraries and process the information to determine possible audience interest. The interest will most often be also based upon the particular content being distributed and experienced. The techniques enable a sophisticated approach to the compilation and analysis of the data so that various selections may be made "on the fly" as the content is experienced based upon the collected and processed data, or at least as the audience members are in a position to experience the content that might be selected (and on the selected device and via the selected transmission path). The content itself is thus selectable and transmissible in real or near-real time based upon selections in view of potential audience interest. FIG. 2 illustrates exemplary components and data flow for a system of the type illustrated in FIG. 1.

As noted above, the system allows for referencing content that can be selected and provided to targeted audience members based upon a range of factors. In the illustrated embodiment of FIG. 2, the content may begin as unindexed content 64, such as in a library or unindexed content repository 66. In practice, various repositories may exist, and these may be disbursed geographically, between companies, between providers, based upon legacy issues, and so forth. In certain applications it may be necessary to convert the unindexed content to different forms, and this will typically be performed by an ingestion system 68. Such ingestion systems may, for example, digitize non-digital content, convert content to formats for use in different types of devices, convert content by addition or changing of reference and metadata, and so forth. Block 70 represents a content analysis engine that operates to analyze the unindexed content and to create indexed content from this base. As will be appreciated by those skilled in the art, such indexing typically references text, image features, subject matter, object and scenes of interest, genre, and so forth. The content analysis engine 70 will produce indexed content 72 which may be stored and indexed content repository 42. Here again, multiple such repositories may be utilized in the system depending upon needs.

As also illustrated in FIG. 2, the devices described above, as indicated generally by reference numeral 18 in FIG. 2 will create data that is harvested and analyzed as indicated by reference numeral 48. A wide range of device data may be available, and this data availability may change over time. To facilitate referencing of the devices and optimization of content for the devices and for particular transmission paths (as described below), various addressing schemes may be referenced as indicated by reference numeral 74 in FIG. 2. These may include, for example, media access control (MAC) addresses, Internet protocol (IP) addresses, international mobile subscriber identities (IMSI), international mobile station equipment identities (IMEI), session identifications, and so forth to mention only a few. For example, with MAC addresses, various technologies may be utilized, such as LTE MAC addresses, WiFi MAC addresses, Bluetooth MAC addresses, and so forth. As will be appreciated by those skilled in the art, such addressing allows for identification of the individual device, in certain cases, and also of transmission paths, network addresses, and so forth. Certain known information may be used to supplement such data, such as models and identifications of the devices, versions of software and devices, cookies and other data available from the devices, known locations of the devices, such as within a home, and so forth. So further, location, session, bandwidth, and similar information may be known by analysis of other features of the devices, such as global positioning system (GPS), location components, cellular network, zone and triangulation components, and so forth. The harvested device data may include a wide range of data elements that can be analyzed for the present purposes. Such data, indicated generally by reference numeral 76 in FIG. 2 may include, for example, the time of day, whether the device or content is liked or disliked by an audience member or audience members, user reactions, key logging (more generally various inputs made by audience members into a device), as well as factors as location, duration of use, history of use, and so forth.

As also noted above, the present techniques allow for the gathering of audience data. In the illustration of FIG. 2, audience environment/behavior sensors 78, which basically include the sensor 54 described above, may be grouped conceptually to provide various audience information. Here again, certain of these sensors may be present in the components on which audio and/or video content is played back. When such cases, addressing such as the addressing described above may be useful. Other sensors may not be addressed in a similar way, or may be addressed in a different way. For example, environmental temperature sensors, motion sensors, presence detectors, activity sensors (e.g., opening and closing of a refrigerator, cooking in the kitchen, etc.) may be independently placed in an environment, or, increasingly, will be networked, such as in a home or business network. In scenarios involving "the Internet of things", for example, many such devices may have data that can be harvested to provide an indication of the audience environment and audience behaviors that may or may not reflect responses to the content. All of the available data of this type may be collected and grouped together as indicated by reference numeral 50 in FIG. 2. Reference numeral 80 indicates various types of data that may be referenced, and it should be noted here again that this is only an example, with much more and detailed data being available in some cases. In this example, the data may include such factors as audience habits, content watched, time in which the content is watched or in which certain activities take place, aggregation of data (e.g., by local processing at the audience location), reactions by the audience, including facial reactions, audio or verbal reactions, movement of the audience members, presence of the audience members, proximity of the audience members to one or another device, "key life events", likes and dislikes, and so forth. It may be noted that the "life events" category may include information collected from the sensors, but may also include information available from wide range of other sources as described below. Such key life events may include, for example, birthdays, births and key events to family members, anniversaries, and so forth. All such factors may be integral to the determination of what content, supplemental content, or replacement content may be of interest to the audience members, what device should be utilized for directing content to the audience members, and even what transmission paths should be used.

Also illustrated in FIG. 2 is the provider background/back office data 56 mentioned above. As also mentioned above, such data may include subscription data, information known from past subscriptions, orders, payment methods, responses to quarries, and so forth, which may be cataloged by various providers. The back office data may also include demographic information such as the key life events discussed above (e.g., birthday, age, marital status, children present, etc.). Finally, other sources of data as indicated by reference numeral 82 may be utilized. Such other sources may be available in some cases and may be used as an indication of the identification of audience members, their interest in certain subject matter, their preferences in terms of times and content, and so forth. Other sources may also be available for referencing local interests in a geographical or community area, weather in the region of the audience, particular news or actuality events taking place, audience demographics, and so forth. The various types of data are input or made available to the processing system 44. As noted above, and as described in greater detail below, the processing system will consider the data, implement any algorithms that may be useful for evaluating both the content available and the possible interest by audience members, and then providing instructions and suggestions as indicated by reference numeral 84. In general, these will include at least three areas of interest in targeting content to particular audience members. These include a content selection from the available indexed repository, a device selection based upon known audience devices, proximity of the devices, availability of the devices, whether the devices are active (on or off), and so forth. Finally, a path or routing selections may be made to provide the most suitable and optimal path for ascending the selected content to the selected device.

Based upon such suggestions and instructions, then, data is provided to one or more providers 40. These providers will draw the selected content from one or more content repositories and send the content to the selected devices in accordance with the suggestions and instructions. It is noted in FIG. 2 that various paths may be used by the providers, as indicated by the arrows between the providers and the devices. That is, base content may be provided to one or more devices, and supplemental content may be provided to other devices that are available to the audience members. Such content may be sent separately or in coordination with the base content, and these transmissions may utilize different transmission paths, different protocols, different transmission technologies, and so forth.

Figure 3:
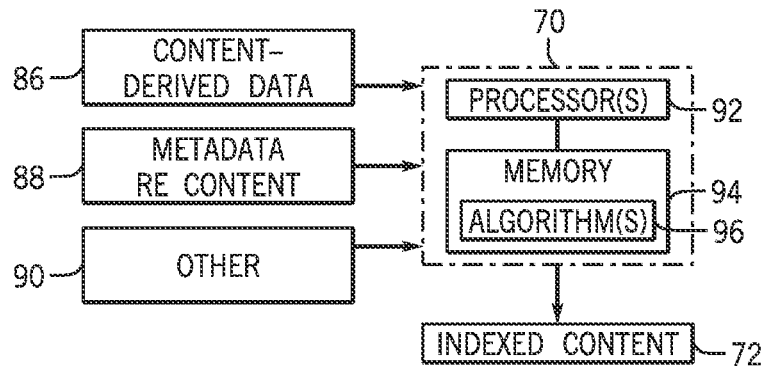
FIG. 3 is a diagrammatical representation of an exemplary content analysis engine for the system.

FIG. 3 is a diagrammatical representation of an exemplary content analysis engine for the system. As noted above, the analysis engine allows for adapting the content, or data associate with the content so that it can be searched and mapped to possible audience members, audience devices, and/or transmission paths. As will be appreciated by those skilled in the art, "indexing" of the content refers to collecting, parsing and storing data, typically metadata, to facilitate rapid and accurate searching and identification of the content for various purposes, in this case, the selection of content for particular audience members. The indexing may be based on a range of factors, such as genre, subject matter, particular scenes, actors, directors, writers, age appropriateness, age of the content, and so forth. Any suitable indexing scheme may be used. In general, as illustrated, the engine 70 may produced indexed content 72 by ingesting content-derived data 86, metadata 88 related to the content, and any other desired data 90. The content-derived data may be determined by automated or semi-automated analysis techniques that review scenes and features of the content for various classifications. The metadata 88 will typically already be associated with the content (e.g., in title, genre, date, and other information), and may be provided in the same or separate electronic files with the content, or may be incorporated in headers, and the like. Such metadata may also come from other sources, such as databases, classifications, and so forth. Such data may also be considered under the rubric "other" noted in the figure, and may reference the content, such as in reviews, ratings, and so forth. One or more processors 92 will review the data by accessing from memory 94 one or more algorithms 96 that allow for detection and classification (indexing) of the individual elements of content, or parts of these.

Figure 4:
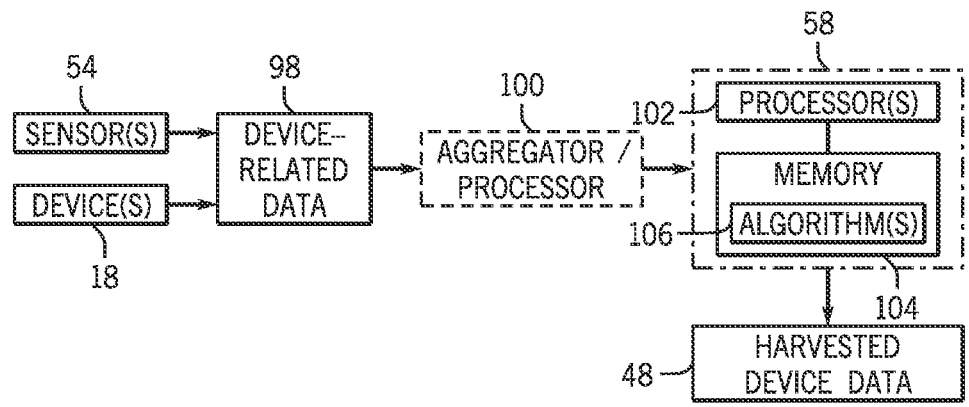
FIG. 4 is a diagrammatical representation of an exemplary device data analysis engine for the system.

FIG. 4 is a diagrammatical representation of an exemplary device data analysis engine for the system. As noted above, a wide range of devices and components may be referenced to extract data that may be used as a basis for content selection and delivery. These might include the playback devices themselves, but also any dedicated or incidental sensors or devices, typically present in the location where the audience is situated, that offer an indication of the devices available, their capability, the capabilities of transmission path components (e.g., bandwidth, utilization, protocols, etc.), location, and so forth. The device-related data 98 is collected or made available, and where needed, an aggregator/processor 100 may at least partially process the data on the audience side before providing the data to the system. The system itself may include one or more processors 102 associated with memory 104 that stores executable algorithms 106 for determining the available devices, their addresses, and any useful factors that may be considered in making the content, device, and transmission path selections. The system thus produces harvested device data 48.

Figure 5:
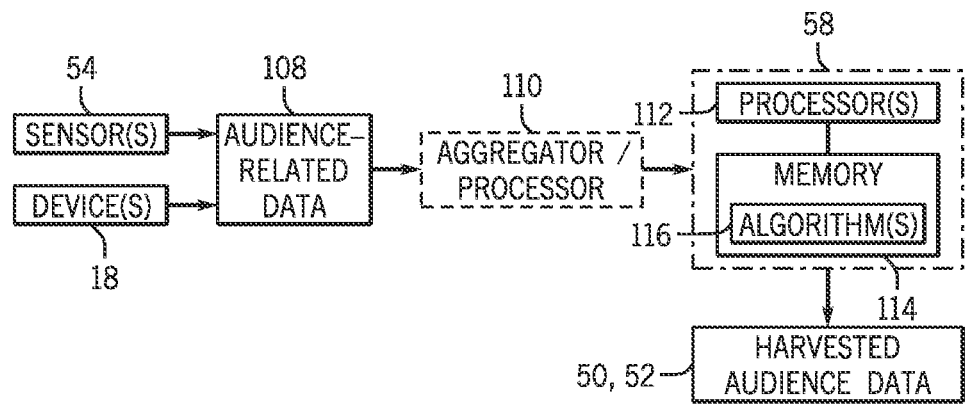
FIG. 5 is a diagrammatical representation of an exemplary audience data analysis engine for the system.

FIG. 5 is a diagrammatical representation of an exemplary audience data analysis engine for the system. As with the device data, a wide range of sensors and devices may be referenced. Many more such devices may become available as interconnectivity of environmental devices (e.g., in-home devices) become networked and provide information that is used or available for other purposes. Such devices may provide reliable information related to times, locations of audience members, proximity of audience members to available devices, ages and demographics of audience members, reactions of audience members to the based or other content provided, and so forth. Here again, the resulting raw audience-related data may be at least partially processed by one or more aggregators/processors 110 before being made available to the system 58. The system includes one or more processors 112 associated with memory 114 storing executable algorithms 116 for analyzing the audience data to determine such information as audience availability, audience interest, and so forth. This audience information is ultimately stored as harvested audience data 50, 52. It should be noted that some or all of the components that receive and process the content data, the device data, and the audience data may be common (or different). In some contexts, dedicated computers will be provided for this purpose, while in others providers and even specialized service companies may offer some or all of this functionality.

Figure 6:
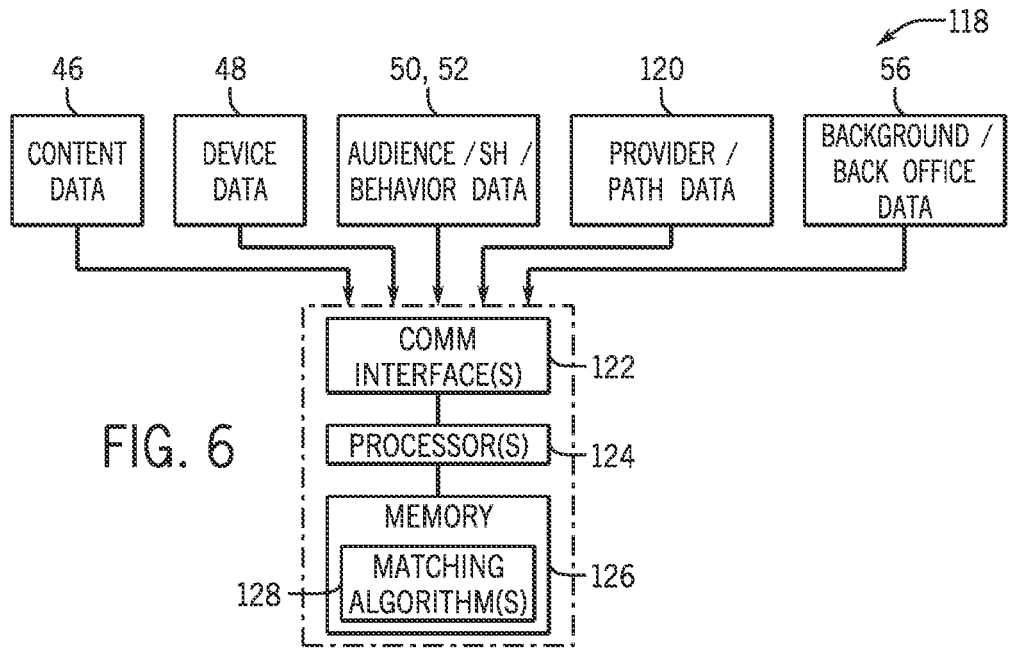
FIG. 6 is a diagrammatical representation of an exemplary data analysis and matching engine for the system.

FIG. 6 is a diagrammatical representation of an exemplary data analysis and matching engine for the system. As noted, the analysis and matching are central to the desired selection of content, devices and transmission paths to target large and/or small audiences to enhance the content experience. In general, the engine 118 will consider at least one form of data, and in many implementations a number of different data types originating from different sources, and indicative of different aspects of the audience, the content, the audience devices, and so forth. In the illustrated embodiment, the data analysis and matching engine 118 considers content data 48, device data 48, audience environment and behavior data, provider and transmission path data 120, and background and back office data 56. The data may be of the type and from sources as discussed above. Moreover, some or all of the data may be at least partially processed prior to communication to the analysis and matching engine. In practice, the data may be tabulated, grouped, annotated, and stored in any suitable manner, and these processed will typically be performed consistent with the one or more protocols used to collect the data, as with the data type, and the software implemented by the engine 118.

The engine itself will typically consist of one or more communications interfaces 122 that serve to receive (and where desired to request or "pull") data. The interfaces may be designed in accordance with any suitable protocol or device standard. The engine also includes one or more processors 124, such as a general purpose processor used in a programmed computer. In practice, a plurality of different processors may be used in different programmed computers that divide the tasks of receiving and analyzing the data, and then of issuing recommendations or instructions to providers. Such processors may be divided by geographical region, for example, or by provider, content source, or in any other manner. The processors execute programmed instructions stored in one or more memory circuits 126 for data analysis based on one or more matching algorithms 128. As will be appreciated by those skilled in the art, the algorithms will typically match indexed content data with the other data, profiles, and so forth. They may develop a store or other metric that is used to determine whether available content matches, more or less closely, certain audience members, certain devices, certain transmission paths, and any other desired target parameters (e.g., time of day, location, relevance to other interests, etc.). In currently contemplated embodiments, the algorithms may run cyclically such that content may be matched and provided to audience members in real or near-real time with the audience activities (e.g., watching or listening to other content, performing certain identifiable activities in certain locations at certain times, audience characteristics and interests that are highly personal or time-dependent (e.g., life events, anniversaries, birthdays), general conditions (e.g., demographics, interests of others of similar demographics, popularity of certain content, weather, social, religious and other events, etc.).

Figure 7:
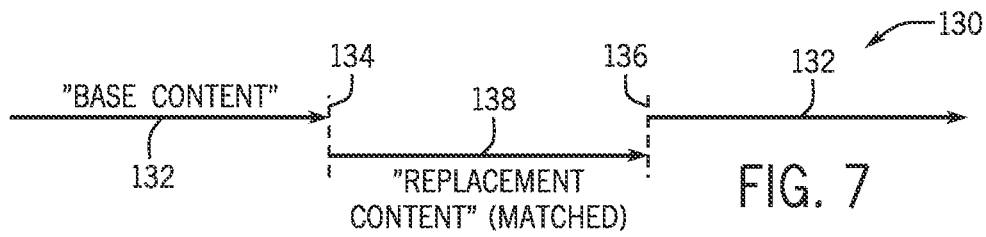
FIG. 7 is a diagrammatical representation of a first exemplary scenario for providing digital content in accordance with the present disclosure.

FIG. 7 is a diagrammatical representation of a first exemplary scenario for providing digital content in accordance with the present disclosure. In this scenario 130, base content 132 is transmitted and experienced by the audience. At a point 134 in the content (or time) and up to another point or time 136, "replacement content" 138 that has been more closely matched to the audience (or to an audience device, to a transmission path, etc.) is transmitted and played instead of the base content. The replacement content will typically have a known duration, ending at time 136. In this scenario, the base content may then resume. It should be noted that any suitable techniques may be used for prompting a shift from the base content to the matched replacement content, including simple transmission of the replacement content rather than the base content, and transmission of both, but a switch or interrupt that prompts the audience device to play one of the data streams or files at a time.

By way of example, in a possible use case in accordance with this embodiment, an email insertion/overlay may be considered. For example, a user may check his/her email in a conventional manner. The email traffic will have traversed a component (e.g., a residential gateway or the like). The email traffic is analyzed by comparing the MAC addresses of the source device and the domain name server (DNS) request (that is, the DNS request may be analyzed). This information is stored by the analysis engine in a database along with a time stamp, the source MAC address, the destination MAC address, and any other desired information. The content matching engine, then may send replacement content to the user's device—such as a coffee advertisement that reaches the user's email.

Figure 8:
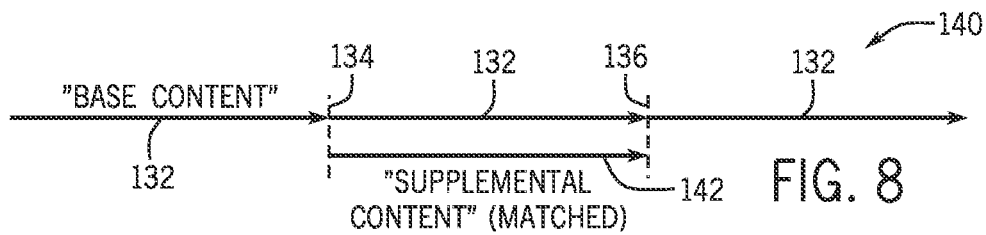
FIG. 8 is a diagrammatical representation of a second exemplary scenario for providing digital content in accordance with the present disclosure.

FIG. 8 is a diagrammatical representation of a second exemplary scenario for providing digital content in accordance with the present disclosure. In this scenario 140, base content 132 is again transmitted and experienced by the audience on a device and/or over a desired transmission path, and between points or times 134 and 136, matches "supplemental content" 142 is transmitted and played. In this scenario, the base content is not replaced, but both the base content and the supplemental content are both transmitted and played. Such scenarios may be used, for example, to transmit content that is superimposed over certain segments of video and/or audio content. Moreover, where desired, the supplemental content may be transmitted to the same audience device via the same or a different transmission path as the base content, or from a different source or provider, etc. In all cases, however, in accordance with the present techniques. The choice of the supplemental content is made based upon collection and analysis of data as described above, followed by matching to the particular audience (and device).

By way of further example, in this embodiment, a linear television insertion or overlay may be considered. For instance, a user may tune to a desired television channel for regular broadcast "linear" programming. The system may detect the channel number or designation, such as form the set-top box. The ensuing traffic may be analyzed by comparing the set-top box identity and the channel tuned. The content distribution/provider path may then send an overlay in the form of an element of content (e.g., a food advertisement).

Figure 9:
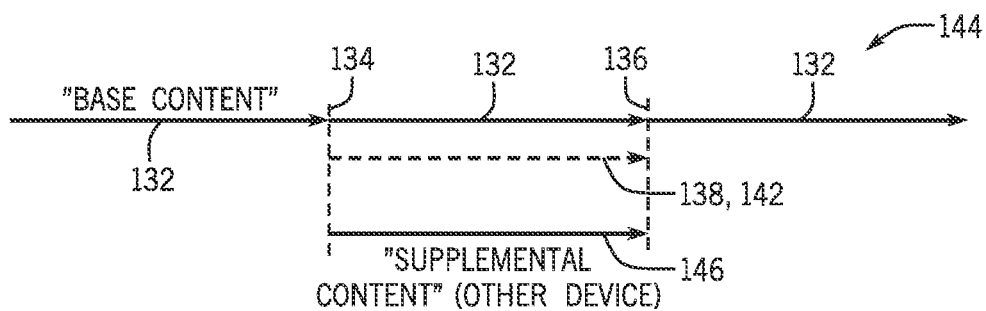
FIG. 9 is a diagrammatical representation of a third exemplary scenario for providing digital content in accordance with the present disclosure.

FIG. 9 is a diagrammatical representation of a third exemplary scenario for providing digital content in accordance with the present disclosure. In this scenario 144, the base content 132 is provided to the audience, and between times 134 and 136, supplemental content 146 matched to the audience is provided on a different device. In most cases, this content will also be selected based upon the particular additional device, its availability, its proximity to the target audience (if known), its display and playback capabilities, the transmission path(s) available for the supplemental content, and so forth. As noted in this figure, such supplemental content may be provide in addition to or instead of replacement content 138 and/or supplemental content 142 that is sent to and played on the same device as the base content.

By way of example, again, in this embodiment an element of content may be sent to another device and/or by another pathway as follows. At some time in the evening, a user watches television and tunes to a particular channel for desired programming, which is detectable by a set-top box. The content analysis engine, then, along with the data analysis engine, finds a matching element of content that may be of interest to the user. The system also detects that there is activity on another device, such as a smart phone (e.g., by detecting an email, user input, user selection, etc.). The smart phone MAC address, IMEI and IMSI numbers may already be stored in the system/engine. The system then quickly determines that the user's attention has shifted from the television to the smart phone, and immediately sends another piece of content (matched for the user) to the smart phone rather than to the television.

Figure 10:
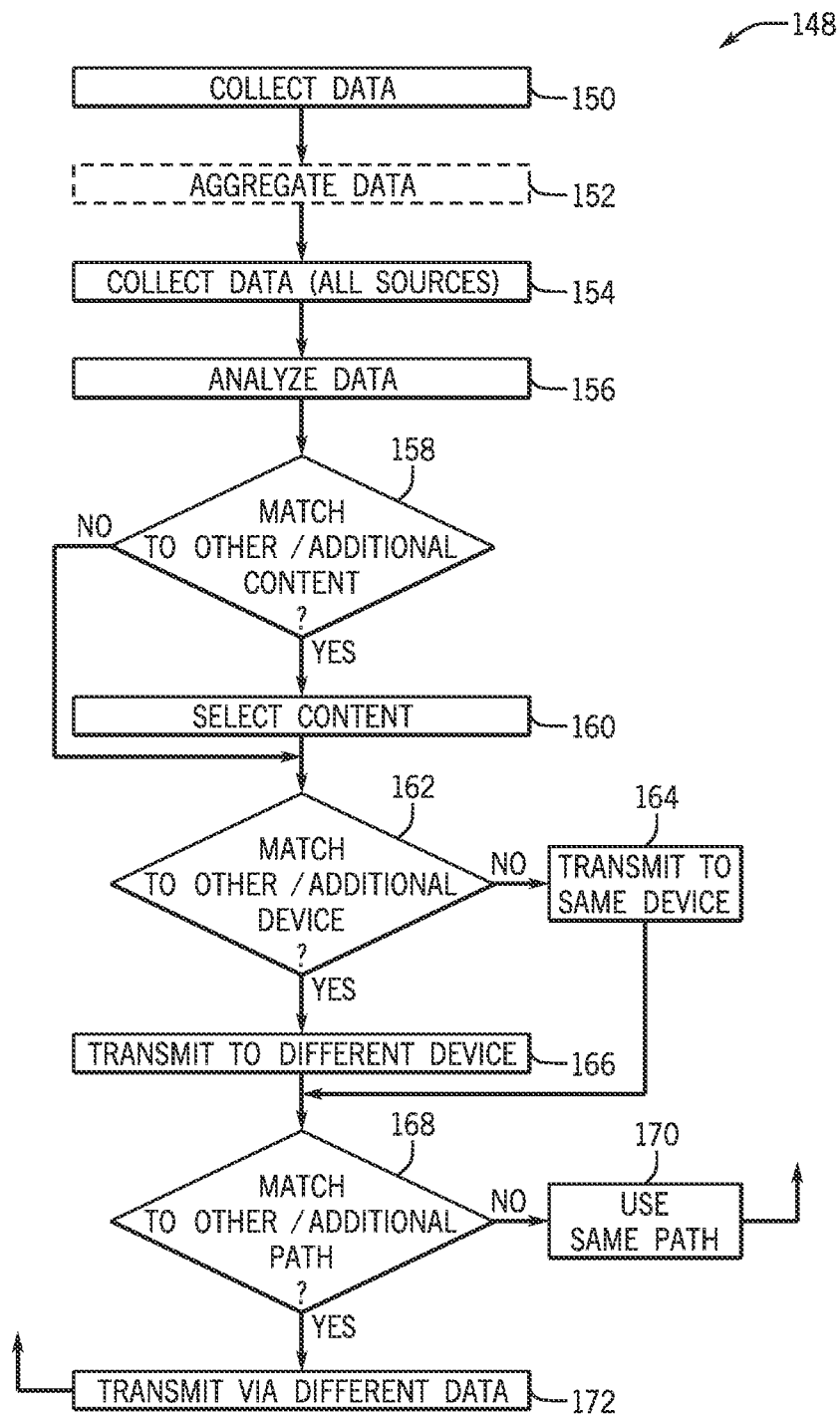
FIG. 10 is a flow chart illustrating exemplary logic that may be used in implementing the digital content audience matching and targeting system.

FIG. 10 is a flow chart illustrating exemplary logic that may be used in implementing the digital content audience matching and targeting system. The process, designated here generally by reference numeral 148 will be implemented by the systems (e.g., engines), processors, and associated components as discussed above. Here again, as indicated by the arrows in FIG. 10, the process may be carried out cyclically and on an ongoing basis, so long as data and content are available for analysis and transmission. The process begins at step 150, with collection of any suitable and available data, typically at the component and/or sensor level. At optional step 152, the data may be aggregated by one or more devices, either on the audience side, the provider side, or both. It should be understood that such aggregation may include some processing, such as filtering, analysis, scoring, or any desired manipulation that may facilitate storing, transmitting, or later analysis of the data. Ultimately, the data is collected from all available sources, as indicated by reference numeral 154.

At step 156, then, the engines, and particularly the matching engine, analyze the data, and the content data, to determine whether any particular element or elements of content might be of particular interest to the particular audience (on a particular device, or via a particular transmission path). At step 158, it is determined whether a content match is detected, and if so, the matched content is selected for transmission to the targeted audience, as indicated at step 160.

If no content match is determined, the system may still look for other types of matches that might enhance the audience experience. For example, as illustrated in the figure, the logic may determine whether there is a better match to another or a different audience device, as indicated at block 162. Such device matches may be based upon whether content is available or more suitable for such devices, whether the audience is using or active with (i.e., "on") the other devices, proximity of the other devices to the audience, and so forth. It might be noted that such other devices may be different from or the same as one another (e.g., a TV versus a smart phone, or two TVs in different rooms of a home). If so, not, the content is transmitted to the same device, as indicated by step 164, and this is the case whether the content is the base content, or replacement content, or supplemental content. If a better match is identified, the content (based, replacement and/or supplemental) is sent to that device as indicated at step 166.

Finally, as indicated by step 168, the system may determine whether a better transmission path is matched to the target audience. This path may include, for example, a different transmission channel, a different transmission protocol, a different transmission technology (e.g., broadcast versus Internet versus cable versus cellular versus Bluetooth, etc.). Here, "path" should be broadly understood, however, and might include factors such as bandwidth, caching, buffering, simultaneous or delayed transmission, and so forth. If no better path is identified, the same path is continued to be used, as indicated at block 170. If a better matched path is identified, it may be used, as indicated at step 172, and this again for any and all of based content, replacement content, and supplemental content.

It should be noted that the present technologies are particularly interesting for real or near-real time detection, analysis, matching and transmission, in most cases, while the audience is experiencing content, or is near or "on" a playback device. In general, the audience will experience the content on one or more playback devices. In certain circumstances, the playback devices may include collective devices, such as cinemas and public displays. In many events, however, the playback devices will be provided in homes, businesses, automobiles, and other more limited venues. As noted above, a range of such devices may be targeted. Various supplemental devices, including modems, routers, streaming media devices, computers, and so forth may be associated with these to provide enhanced functionality. Still further, personalized devices such as tablets and hand-held computers, monitors, smartphones, hand-held media players, computers, laptops, and the like may be utilized to receive, decode, and play the content. The content may also be stored for later experiencing. That is, some or all of the targeted devices may also be adapted for receipt and playback of content in real time or near-real time as the content is distributed. However, where storage and time-shifting techniques are utilized, timing is much more flexible. Where Internet distribution and other individualized content demand and receipt technologies are utilized, the content may be requested, distributed and played back in a highly individualized manner.

It may also be noted that the scenarios and bases for providing matched content may vary, and many different use and business cases may present themselves, and differ for different providers. For example, the content may be free to the audience, or simply provided as a service (particularly where commercial or advertising interests support the effort). On the other hand, certain content may be sponsored, and the matching criteria may take this into account. In other contexts, the content and matching may be part of a subscription service, an enhanced subscription service, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for providing digital content to a target audience, comprising:
   monitoring audience-related data indicative of a specific target audience as an indication of potential interests of the target audience;
   monitoring device-related data indicative of a content playback device available to the target audience, the device-related data being collected with respect to a plurality of different devices available to the target audience;
   referencing content-related data related to available content associated with base content currently playing on a first device of the plurality of different devices available to the target audience that is selected for playback of the base content;
   monitoring a network gateway;
   determining, via the monitoring of the network gateway, that network traffic is traversing the network gateway;
   identifying, via the network traffic, a source network address corresponding to a second device of the plurality of different devices, wherein the network traffic is indicative of the target audience interacting with the second device;
   attributing the network traffic to a shift in the target audience's attention from the first device to the second device of the plurality of different devices based on the identification of the source network address via the network traffic; and
   targeting the second device for playback of an element of the available content based upon the shift in the target audience's attention from the first device to the second device, by:
      selecting the element of the available content that matches the target audience based upon the audience-related data and the device-related data; and
      providing, at the second device, the selected element of the available content based upon a match of the content-related data and upon the audience-related data and the device-related data.

2. The method of claim 1, wherein the audience-related data comprises historical and/or background data about the target audience stored by a content provider.

3. The method of claim 1, wherein the audience-related data comprises data collected from one or more components and/or sensors present where the audience is located.

4. The method of claim 1, wherein the audience-related data comprises data indicative of behavior of the target audience at the time the matching and providing steps are performed, the behavior comprising gaze, requesting different content, changing a channel at the first device, increasing or decreasing audio volume of the first device, visiting websites or other content during playback of the base content, or any combination thereof.

5. The method of claim 1, wherein the audience-related data or the device-related data comprises data indicative of proximity of the target audience to a specific playback device.

6. The method of claim 1, wherein the device-related data comprises data indicative of a transmission path for transmission of content to a specific audience playback device.

7. The method of claim 1, comprising adapting a matching algorithm used in the selecting the element of available content that matches the target audience, based upon the audience-related data and the device-related data that is available.

8. The method of claim 1, comprising:
selecting one of a plurality of transmission channels to the second device, based at least upon the device-related data;
wherein the selected element of the available content is provided to the second device via the selected one of the plurality of transmission channels.

9. A processing system for providing digital content to a target audience, comprising:
a processor, configured to:
receive audience-related data indicative of a specific target audience as an indication of potential interests of the target audience, the audience-related data being collected from one or more components or sensors present in a location with the target audience and detecting data during a time when the target audience is experiencing based content;
receive device-related data indicative of a content playback device available to the target audience, the device-related data being collected with respect to a plurality of different devices available to the target audience, to a plurality of different content transmission paths to such devices, or both;
reference content-related data related to available content associated with base content currently playing on a first device of the plurality of different devices available to the target audience that is selected for playback of the base content;
monitor a network gateway;
determine, via the monitoring of the network gateway, that network traffic is traversing the network gateway;
identify, via the network traffic, a source network address corresponding to a second device of the plurality of different devices, wherein the network traffic is indicative of the target audience interacting with the second device;
attribute the network traffic to a shift in the target audience's attention from the first device to the second device of the plurality of different devices based on the identification of the source network address via the network traffic; and
target the second device for playback of an element of the available content based upon the shift in the target audience's attention from the first device to the second device, by:
selecting the element of the available content that matches the target audience based upon the audience-related data and the device-related data; and
providing, at the second device, the selected element of the available content based upon a match of the content-related data and upon the audience-related data and the device-related data.

10. The processing system of claim 9, wherein the audience-related data comprises data indicative of behavior of the target audience at the time the matching and providing steps are performed, the behavior comprising gaze, requesting different content, changing a channel at the first device, increasing or decreasing audio volume of the first device, visiting websites or other content during playback of the base content, or any combination thereof.

11. The processing system of claim 9, wherein the content-related data comprises indexed data derived from the available content or metadata associated with the available content.

12. A system for providing digital content to a target audience, comprising:
audience-related data components and/or sensors that, in operation, monitor audience-related data indicative of a specific target audience as an indication of potential interests of the target audience;
device-related data components and/or sensors that, in operation, monitor device-related data indicative of a content playback device available to the target audience, the device-related data being collected with respect to a plurality of different devices available to the target audience; and
processing circuitry configured to:
reference content-related data related to available content associated with base content currently playing on a first device of the plurality of different devices available to the target audience that is selected for playback of the base content;
monitor a network gateway;
determine, via the monitoring of the network gateway, that network traffic is traversing the network gateway;
identify, via the network traffic, a source network address corresponding to a second device of the plurality of different devices, wherein the network traffic is indicative of the target audience interacting with the second device;
attribute the network traffic to a shift in the target audience's attention from the first device to the second device of the plurality of different devices based on the identification of the source network address via the network traffic; and
target the second device for playback of an element of the available content based upon the shift in the target audience's attention from the first device to the second device, by:
determining a match between the available content, the second device, and a target audience based upon the content-related data, the audience-related data, and the device-related data; and outputting recommendations, instructions, or both for providing selected content device from the available content, to the second device, based upon the match.

13. The system of claim 12, wherein the audience-related data components and/or sensors are present in a location with the target audience and detect the audience-related data during a time when the audience is experiencing based content.

14. The system of claim 12, wherein the device-related data components and/or sensors collect data with respect to a plurality of different devices available to the target audience and/or to a plurality of different content transmission paths to such devices.

15. The system of claim 12, comprising one or more repositories of the available content and a content analysis engine that analyzes the available content to produce indexed data derived from the available content or metadata associated with the available content.

16. The method of claim 1, wherein determining, via the monitoring of the network gateway, that network traffic is traversing the network gateway comprises monitoring email traffic via the network gateway.

17. The method of claim 16, wherein providing, at the second device, the selected element of the available content comprises providing the selected element of the available content as an overlay or insertion to an email.

18. The method of claim 1, wherein the source network address corresponding to the second device comprises a media access control (MAC) address, an Internet protocol (IP) address, an international mobile subscriber identity (IMSI), an international mobile station equipment identity (IMEI), or a session identification.

19. The method of claim 1, wherein providing, at the second device, the selected element of the available content comprises interrupting the base content playing on the first device and displaying the selected element of the available content on the second device.

20. The method of claim 1, wherein the selected element of the available content comprises one or more advertisements.

* * * * *